US011139867B2

(12) United States Patent
Sasaki et al.

(10) Patent No.: US 11,139,867 B2
(45) Date of Patent: Oct. 5, 2021

(54) ANTENNA DISPLACEMENT CORRECTION METHOD AND DEVICE FOR OAM MULTIPLEXING COMMUNICATION SYSTEM

(71) Applicant: NIPPON TELEGRAPH AND TELEPHONE CORPORATION, Tokyo (JP)

(72) Inventors: Hirofumi Sasaki, Yokosuka (JP); Doohwan Lee, Yokosuka (JP); Hiroyuki Fukumoto, Yokosuka (JP); Hiroyuki Shiba, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/042,703

(22) PCT Filed: Mar. 28, 2019

(86) PCT No.: PCT/JP2019/013894
§ 371 (c)(1),
(2) Date: Sep. 28, 2020

(87) PCT Pub. No.: WO2019/189704
PCT Pub. Date: Oct. 3, 2019

(65) Prior Publication Data
US 2021/0058118 A1    Feb. 25, 2021

(30) Foreign Application Priority Data

Mar. 30, 2018  (JP) .............................. JP2018-069363

(51) Int. Cl.
| H04B 7/04 | (2017.01) |
| H04B 7/0417 | (2017.01) |
| H04B 17/21 | (2015.01) |
| H04B 17/30 | (2015.01) |

(Continued)

(52) U.S. Cl.
CPC ........... *H04B 7/0421* (2013.01); *H01Q 21/20* (2013.01); *H04B 7/043* (2013.01); *H04B 17/21* (2015.01); *H04B 17/30* (2015.01)

(58) Field of Classification Search
CPC .. H04B 7/0413; H04B 7/0417; H04B 7/0421; H04B 7/043; H04B 7/0434; H04B 17/21;
(Continued)

(56) References Cited

U.S. PATENT DOCUMENTS

2010/0171663 A1* 7/2010 Fukada .................... G01S 11/04
                                                           342/394
2017/0054487 A1* 2/2017 Suk .................... H04L 25/03331
(Continued)

OTHER PUBLICATIONS

J Wang et al., "Terabit free-space data transmission employing orbital angular momentum multiplexing," Nature Photonics, vol. 6, pp. 488-496, Jul. 2012.
(Continued)

*Primary Examiner* — Siu M Lee
(74) *Attorney, Agent, or Firm* — Harness, Dickey & Pierce, P.L.C.

(57) ABSTRACT

An antenna displacement correction method for an OAM multiplexing communication system includes: a step of estimating a displacement amount by evaluating an evaluation function defined such that a theoretical channel response between a transmitting antenna and a receiving antenna matches a measured channel response estimated in a receiving station by using a known signal transmitted from a transmitting station, wherein the theoretical channel response has, as a parameter, the displacement amount indicating an amount of displacement of a reference axis predefined for each of the transmitting antenna and the receiving antenna from a predetermined position with respect to a desired relative positional relationship between the transmitting antenna and the receiving antenna; and a
(Continued)

step of correcting a displacement of each of the transmitting antenna and the receiving antenna according to the estimated displacement amount.

5 Claims, 5 Drawing Sheets

(51) Int. Cl.
   *H01Q 21/20* (2006.01)
   *H04B 7/0426* (2017.01)
(58) Field of Classification Search
   CPC .... H04B 17/30; H04B 17/309; H04B 17/318; H04B 17/345; H04B 17/373; H04B 17/391; H01Q 21/20
   See application file for complete search history.

(56) References Cited

U.S. PATENT DOCUMENTS

| | | | |
|---|---|---|---|
| 2018/0248262 A1* | 8/2018 | Freyssinier | G01S 13/44 |
| 2020/0076517 A1* | 3/2020 | Zhu | H04B 17/21 |

OTHER PUBLICATIONS

Z.Li, Y.Ohashi, K.Kasai, "A dual-channel wireless communication system by multiplexing twisted radio wave" Proceedings of 44th European Microwave Conference, pp. 235-238, Oct. 2014.
International Search Report issued in PCT/JP2019/013894, dated Jun. 25, 2019.

* cited by examiner

ANTENNA DISPLACEMENT CORRECTION METHOD AND DEVICE FOR OAM MULTIPLEXING COMMUNICATION SYSTEM

CROSS-REFERENCE TO RELATED APPLICATIONS

This application is a 371 U.S. National Phase of International Application No. PCT/JP2019/013894, filed on Mar. 28, 2019, which claims priority to Japanese Application No. 2018-069363, filed on Mar. 30, 2018. The entire disclosures of the above applications are incorporated herein by reference.

TECHNICAL FIELD

The present invention relates to an antenna displacement correction method and an antenna displacement correction device for an OAM multiplexing communication system subjecting a radio signal to spatial multiplex transmission by using orbital angular momentum (OAM) of an electromagnetic wave.

BACKGROUND ART

In recent years, in order to improve a transmission capacity in communication between two points, that is, point to point (P2P) communication, a spatial multiplex transmission technique of multiplexing a signal in a line-of-sight situation has been reported. For example, in an OAM multiplexing communication system, signals in respective OAM modes modulated with different signal sequences are separated in a receiving station by using a property that spatial phase distributions of beams having different OAM modes are orthogonal to each other, and thus the signals can be subjected to spatial multiplex transmission in a line-of-sight situation.

In Non-Patent Document 1 that is one of specific reports, beams radiated from a plurality of Horn antennae are converted into different OAM modes and coaxially combined with each other by a phase plate, to be transmitted, and thus signals are successfully subjected to coaxial multiplex transmission. In Non-Patent Document 2, there is a report in which a plurality of OAM modes are generated by using a uniform circular array (UCA), and thus spatial multiplex transmission of signals is performed.

PRIOR ART DOCUMENT

Non-Patent Document

Non-Patent Document 1: J. Wang et al., "Terabit free-space data transmission employing orbital angular momentum multiplexing," Nature Photonics, Vol. 6, pp. 488 to 496, July 2012.
Non-Patent Document 2: Z. Li, Y. Ohashi, K. Kasai, "A dual-channel wireless communication system by multiplexing twisted radio wave," Proceedings of 44th European Microwave Conference, pp. 235 to 238, October 2014.

SUMMARY OF INVENTION

Problems to be Solved by the Invention

Antennae for transmitting and receiving beams having OAM modes are required to be disposed to face each other. If a displacement with respect to a predetermined relative positional relationship indicating the facing state occurs, the orthogonality between the OAM modes is broken, and thus inter-mode interference is caused. However, it is hard to remove the fine displacement by performing adjustment with the eyes, and a method and a device for estimating and correcting a displacement amount with high accuracy are required.

An object of the present invention is to provide an antenna displacement correction method and an antenna displacement correction device for an OAM multiplexing communication system that can estimate and correct a displacement amount with respect to a predetermined relative positional relationship, regarding a transmitting antenna and a receiving antenna disposed in a line-of-sight situation.

Means for Solving the Problems

A first invention is directed to an antenna displacement correction method for an OAM multiplexing communication system that performs spatial multiplex transmission by using different spatial multiplex modes between a transmitting antenna and a receiving antenna respectively included in a transmitting station and a receiving station disposed to face each other in a line-of-sight situation. The antenna displacement correction method includes: a displacement amount estimation step that estimates a displacement amount by evaluating an evaluation function defined such that a theoretical channel response between the transmitting antenna and the receiving antenna matches a measured channel response estimated in the receiving station by using a known signal transmitted from the transmitting station, wherein the theoretical channel response has, as a parameter, the displacement amount indicating an amount of displacement of a reference axis predefined for each of the transmitting antenna and the receiving antenna from a predetermined position with respect to a desired relative positional relationship between the transmitting antenna and the receiving antenna; and a displacement correction step that corrects a displacement of each of the transmitting antenna and the receiving antenna according to the estimated displacement amount.

In the antenna displacement correction method of the first invention, each of the transmitting antenna and the receiving antenna includes a single equal-interval uniform circular array (UCA) or a plurality of UCAs disposed concentrically. The displacement amount estimation step: includes a step that performs, in the transmitting station and the receiving station, processes corresponding to discrete Fourier transform and inverse transform with a same magnitude as a number of antenna elements of the UCA with respect to each propagation channel formed between the UCAs of the transmitting antenna and the receiving antenna; and estimates the displacement amount by evaluating the evaluation function that is defined by using a channel response including the processes corresponding to the discrete Fourier transform and the inverse transform.

In the antenna displacement correction method of the first invention, the evaluation function may be an absolute value of a difference in one or more corresponding elements between the theoretical channel response and the measured channel response. The evaluation function may be an absolute value of a difference in magnitude of one or more corresponding elements between the theoretical channel response and the measured channel response. The displacement amount may be estimated by using different frequencies, different polarized waves, or both thereof.

A second invention is directed to an antenna displacement correction device for an OAM multiplexing communication system that performs spatial multiplex transmission by using different spatial multiplex modes between a transmitting antenna and a receiving antenna respectively included in a transmitting station and a receiving station disposed to face each other in a line-of-sight situation, the antenna displacement correction device comprising. The antenna displacement correction device includes: a displacement amount estimation unit that estimates a displacement amount by evaluating an evaluation function defined such that a theoretical channel response between the transmitting antenna and the receiving antenna matches a measured channel response estimated in the receiving station by using a known signal transmitted from the transmitting station, wherein the theoretical channel response has, as a parameter, the displacement amount indicating an amount of displacement of a reference axis predefined for each of the transmitting antenna and the receiving antenna from a predetermined position with respect to a desired relative positional relationship between the transmitting antenna and the receiving antenna; and a displacement correction unit that corrects a displacement of each of the transmitting antenna and the receiving antenna according to the estimated displacement amount.

In the antenna displacement correction device of the second invention, each of the transmitting antenna and the receiving antenna includes a single equal-interval uniform circular array (UCA) or a plurality of UCAs disposed concentrically. The displacement amount estimation unit: includes a unit that performs, in the transmitting station and the receiving station, processes corresponding to discrete Fourier transform and inverse transform with a same magnitude as a number of antenna elements of the UCA with respect to each propagation channel formed between the UCAs of the transmitting antenna and the receiving antenna; and estimates the displacement amount by evaluating the evaluation function that is defined by using a channel response including the processes corresponding to the discrete Fourier transform and the inverse transform.

Effect of the Invention

According to the present invention, it is possible to estimate and correct the displacement amount by minimizing a difference between theoretical propagation channel information having the displacement amount with respect to the predetermined relative positional relationship as a parameter and measured propagation channel information.

Accordingly, since the displacement amount can be estimated and corrected with high accuracy, inter-mode interference can be reduced and improvement in a system throughput and frequency use efficiency is expected.

EMBODIMENTS

Embodiment 1

Figure 1:
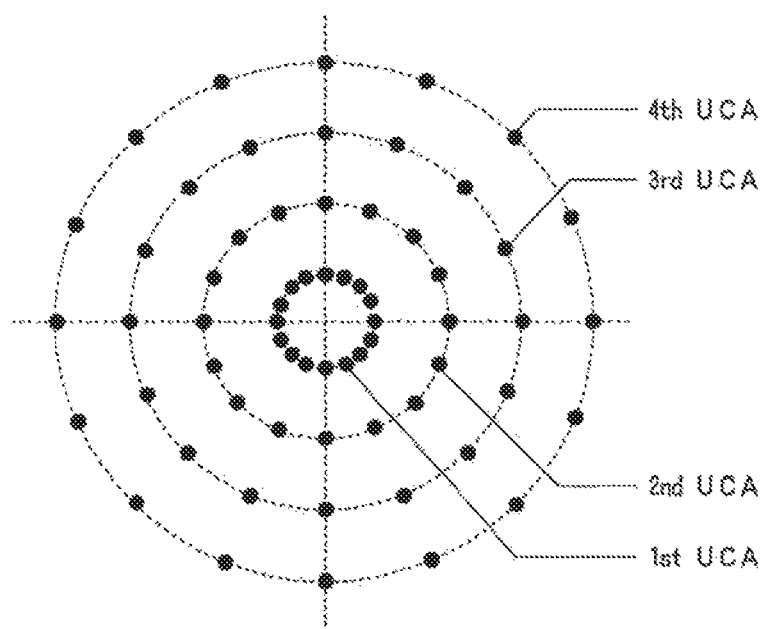
FIG. 1 is a diagram showing a configuration example of an M-UCA of an OAM multiplexing communication system according to the present invention.

FIG. 1 shows a configuration example of an M-UCA of an OAM multiplexing communication system according to the present invention.

In FIG. 1, the M-UCA has a configuration in which a plurality of UCAs are disposed concentrically. Herein, a configuration in which four UCAs having different radii are disposed is illustrated, and the UCAs are referred to as a first UCA, a second UCA, a third UCA, and a fourth UCA in this order from the inner. As an example, each UCA includes 16 antenna elements (indicated by • in FIG. 1), but the number of antenna elements of each UCA is not necessarily required to be the same. The antenna element constituting the M-UCA may be Horn antennae, patch antennae, or other antennae.

Figure 2:
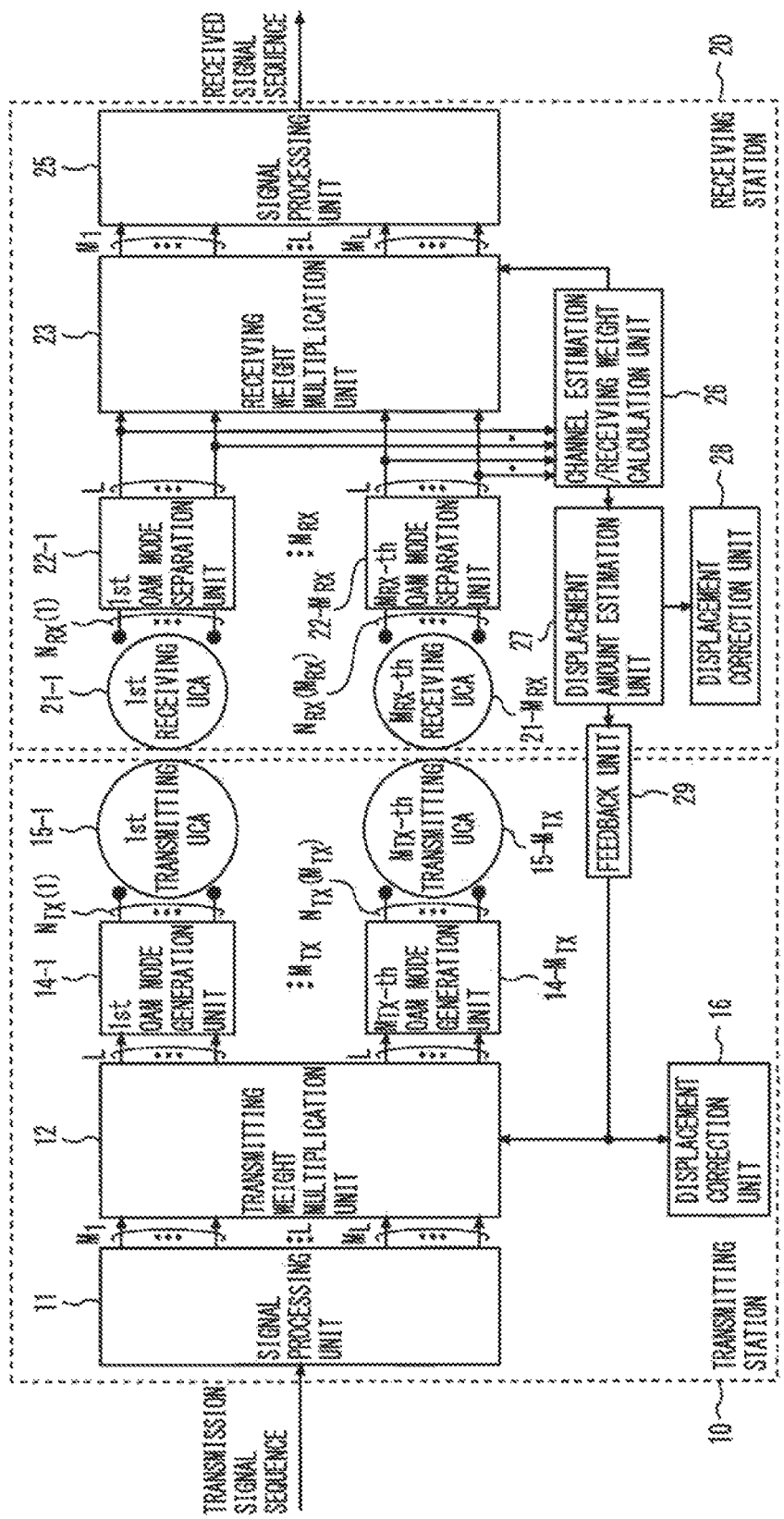
FIG. 2 is a diagram showing a configuration example of the OAM multiplexing communication system according to the present invention.

FIG. 2 shows a configuration example of the OAM multiplexing communication system according to the present invention.

In FIG. 2, a transmitting station 10 includes a plurality of $M_{TX}$ UCAs such as a first transmitting UCA 15-1 to an $M_{TX}$-th transmitting UCA 15-$M_{TX}$, and the respective numbers of transmitting antenna elements are $N_{TX}(1)$ to $N_{TX}(M_{TX})$. A signal processing unit 11 receives a transmission signal sequence, and generates $M_1$ to $M_L$ signals respectively transmitted in OAM modes #1 to #L. A transmitting weight multiplication unit 12 multiplies each signal generated by the signal processing unit 11 by a transmitting weight to generate signals to be transmitted in the OAM modes #1 to #L from each UCA. Each of a first OAM mode generation unit 14-1 to an $M_{TX}$-th OAM mode generation unit 14-$M_{TX}$ receives the signals to be transmitted in the OAM modes #1 to #L, adjusts phases of the signals to be transmitted as signals in the OAM modes #1 to #L, and inputs the signals to the antenna elements of each UCA.

A receiving station 20 includes a plurality of $M_{RX}$ UCAs such as a first receiving UCA 21-1 to an $M_{RX}$-th receiving UCA 21-$M_{RX}$, and the respective numbers of receiving antenna elements are $N_{RX}(1)$ to $N_{RX}(M_{RX})$. A first OAM mode separation unit 22-1 to an $M_{RX}$-th OAM mode separation unit 22-$M_{RX}$ separate signals in the OAM modes #1 to #L from signals received by the first receiving UCA 21-1 to the $M_{RX}$-th receiving UCA 21-$M_{RX}$, respectively. A receiving weight multiplication unit 23 receives the signals in the OAM modes #1 to #L separated for each UCA, collects the signals for each OAM mode, multiplies the signals by respective receiving weights, and outputs the signals as $M_1$ to $M_L$ signals. A signal processing unit 25 demodulates the signal received in each UCA and each OAM mode, and outputs a received signal sequence.

Moreover, the receiving station 20 includes a channel estimation/receiving weight calculation unit 26 that estimates channel information and calculates a receiving weight by using output signals from the first OAM mode separation unit 22-1 to the $M_{RX}$-th OAM mode separation unit 22-$M_{RX}$. The channel estimation/receiving weight calculation unit 26 sets the calculated receiving weight for the receiving weight multiplication unit 23, and outputs the measured channel information to a displacement amount estimation unit 27. The displacement amount estimation unit 27 estimates a displacement amount by using the measured channel information, notifies a displacement correction unit 28 of the displacement amount, and also notifies a displacement correction unit 16 of the transmitting station 10 of the displacement amount via a feedback unit 29. The channel information and a transmitting weight estimated by the channel estimation/receiving weight calculation unit 26 are set for the transmitting weight multiplication unit 12 of the transmitting station 10 via the feedback unit 29.

Each of the displacement correction unit 28 of the receiving station 20 and the displacement correction unit 16 of the transmitting station 10 includes an automatic or manual displacement correction mechanism, and corrects a displacement based on the notified displacement amount.

The transmitting weight multiplication unit 12, the receiving weight multiplication unit 23, the first OAM mode generation unit 14-1 to the $M_{TX}$-th OAM mode generation unit 14-$M_{TX}$, and the first OAM mode separation unit 22-1 to the $M_{RX}$-th OAM mode separation unit 22-$M_{RX}$ may perform either one of digital signal processing and analog signal processing, and a DA converter or an AD converter is disposed at an appropriate position according to each processing method. The first OAM mode generation unit 14-1 to the $M_{TX}$-th OAM mode generation unit 14-$M_{TX}$ of the transmitting station 10, and the first OAM mode separation unit 22-1 to the $M_{RX}$-th OAM mode separation unit 22-$M_{RX}$ of the receiving station 20 are sequentially coupled to the antenna elements of the respectively corresponding UCAs in the same rotational direction.

Definition of Equations

First, a displacement amount may be defined by way of taking coordinate axes depending on a shape of an antenna fixing jig or the like In the present embodiment, the displacement amount is defined by the following parameters.

Figure 3:
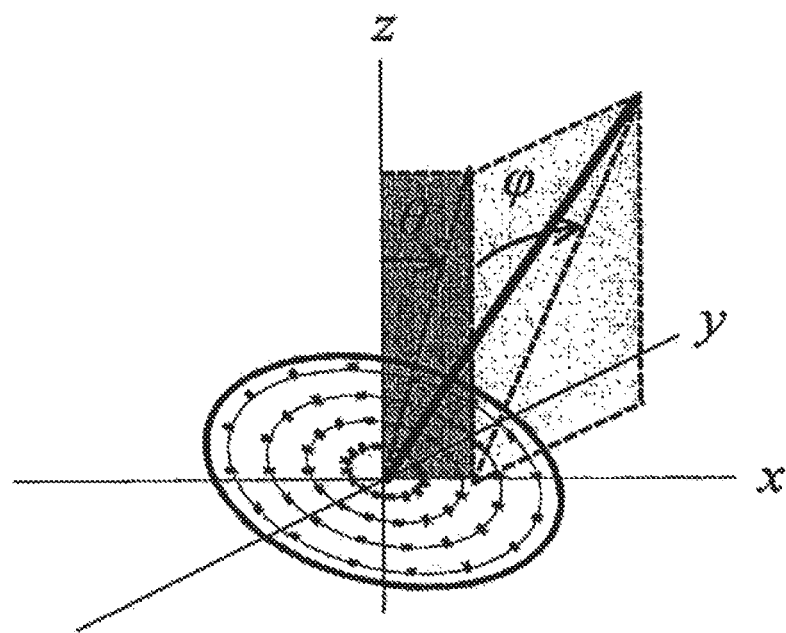
FIG. 3 is a diagram showing definition of a displacement of transmitting and receiving antennae.
Figure 4:
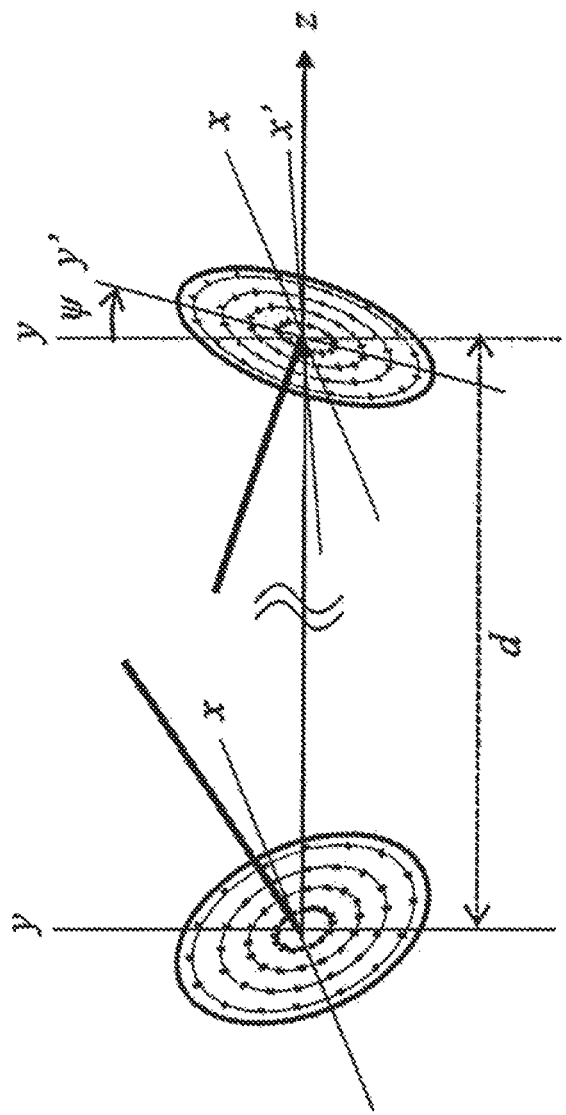
FIG. 4 is a diagram showing definition of a displacement of transmitting and receiving antennae.

As shown in FIGS. 3 and 4, when an original M-UCA is ideally disposed on an xy plane and is disposed such that a propagation axis of a beam having OAM is a z axis, the displacement amount of an actual M-UCA is defined by a y-axis symmetric rotation angle $\theta$, an x-axis symmetric rotation angle $\varphi$, and a relative z-axis symmetric rotation angle $\psi$ between transmitting and receiving antennae. A rotation order is as described. A distance d between the transmitting and receiving antennae is also estimated when the distance is unknown.

When a coordinate of a receiving antenna element a in a complete facing state is $V_{rx,a}$, and a coordinate of a transmitting antenna element b in the complete facing state is $V_{tx,b}$, a coordinate $V'_{rx,a}$ of the receiving antenna element and a coordinate $V'_{tx,b}$ of the transmitting antenna element including the displacement can be expressed as follows.

$$V'_{rx,a} = R_z(\psi/2) \times R_x(\varphi_{rx}) \times R_y(\theta_{rx}) \times V_{rx,a} \quad (1)$$

$$V'_{tx,b} = R_z(-\psi/2) \times R_x(\varphi_{tx}) \times R_y(\theta_{tx}) \times V_{tx,b}$$

Here, $$R_x(\theta) = \begin{pmatrix} 1 & 0 & 0 \\ 0 & \cos(\theta) & -\sin(\theta) \\ 0 & \sin(\theta) & \cos(\theta) \end{pmatrix}$$

$$R_y(\theta) = \begin{pmatrix} \cos(\theta) & 0 & \sin(\theta) \\ 0 & 1 & 0 \\ -\sin(\theta) & 0 & \cos(\theta) \end{pmatrix}$$

-continued $$R_z(\theta) = \begin{pmatrix} \cos(\theta) & -\sin(\theta) & 0 \\ \sin(\theta) & \cos(\theta) & 0 \\ 0 & 0 & 1 \end{pmatrix}$$

In this case, a value of a propagation channel between the transmitting and receiving antenna elements when the displacement as shown in FIG. 3 occurs can be calculated as follows.

$$\frac{\lambda^2}{4\pi d_{a,b}}\left(\frac{1}{2\pi d_{a,b}} + \frac{1}{i\lambda}\right)\exp(-2i\pi d_{a,b}) \quad (2)$$

Here, $\lambda$ is a wavelength of an electromagnetic wave. In addition, $d_{a,b}$, which is a distance between the receiving antenna element a and the transmitting antenna element b, is expressed as follows.

$$d_{a,b} = \text{norm}(V'_{rx,a} - V'_{tx,b}) \quad (3)$$

In view of the above, a propagation channel matrix H between the transmitting and receiving antennae is expressed as follows.

$$H = \begin{bmatrix} h_{1,1} & \cdots & h_{1,M_{TX}} \\ \vdots & \ddots & \vdots \\ h_{M_{RX},1} & \cdots & h_{M_{RX},M_{TX}} \end{bmatrix} \quad (4)$$

A partial channel matrix $h_{m,n}$ is a matrix of $N_{RX}(m) \times N_{TX}(n)$, and indicates the propagation channel between the m-th receiving UCA 21-$m$ and the n-th transmitting UCA 15-$n$. Here, $m=1, 2, \ldots$, and $M_{RX}$, and $n=1, 2, \ldots$, and $M_{TX}$.

Since rotational symmetry occurs with respect to the propagation axis when the transmitting antenna and the receiving antenna are disposed to face each other, the channel matrix between the antennae is a circulant matrix. Thus, due to the property of the circulant matrix, the propagation channel $h_{m,n}$ between the respective UCAs may be subjected to singular value decomposition by using a discrete Fourier transform (DFT) matrix $D_N \in C^{N*N}$, as follows.

$$h_{m,n} = D_{N_{TX}(n)} \sum\nolimits_{m,n} D^H_{N_{RX}(m)} \quad (5)$$

$$\sum\nolimits_{m,n}(x,y) = \begin{Bmatrix} \sqrt{\lambda_{mn,x}} & (x=y) \\ 0 & (x \neq y) \end{Bmatrix} \text{ Here,}$$

$$D_N(x,y) = e^{j\left(\frac{2\pi(y-1)}{N}\right)l(x)}/\sqrt{N} \quad (x, y = 1, 2, \ldots, N) \quad (6)$$

$$l(x) = x - (\lceil N/2 \rceil + 1)$$

It should be noted that x and y used in Equations (5) and (6) respectively indicate indexes of a row and a column of each of the matrix/and the matrix D. Hereinafter, the same expression is used for an index of a matrix or a vector. In addition, l(x), which is a value of an eigenmode in a circumferential direction dimension corresponding to an eigenvector of x rows of the DFT matrix, indicates the OAM mode.

In this case, from Equation (5), the number of singular values of the propagation channel between the respective UCAs is min[$N_{RX}(m), N_{TX}(n)$]. Thus, the propagation channel between the m-th receiving UCA 21-*m* and the n-th transmitting UCA 15-*n* is orthogonalized as in Equation (7), and thereby min[$N_{RX}$(m), $N_{TX}$(n)] independent transmission paths can be secured.

$$\Sigma_{m,n} = D_{N_{TX}(n)}{}^H h_{m,n} D_{N_{RX}(m)} \quad (7)$$

Equation (7) represents OAM mode generation and separation processes which are processes corresponding to the discrete Fourier transform and the inverse transform.

Next, when L is set to min($N_{RX}$, $N_{TX}$), a channel response A including the OAM mode generation and separation processes is formed as in Equation (8).

$$\Lambda = \begin{bmatrix} H_{l(1),l(1)} & \cdots & H_{l(1),l(L)} \\ \vdots & \ddots & \vdots \\ H_{l(L),l(1)} & \cdots & H_{l(L),l(L)} \end{bmatrix} \quad (8)$$

Here, $H_{l(x),l(y)}$ is a channel between OAM modes l(x) and l(y), and is expressed by Equation (9).

$$H_{l(x),l(y)} = \begin{bmatrix} \Sigma_{1,1}(x,y) & \cdots & \Sigma_{1,M_{TX}}(x,y) \\ \vdots & \ddots & \vdots \\ \Sigma_{M_{RX},1}(x,y) & \cdots & \Sigma_{M_{RX},M_{TX}}(x,y) \end{bmatrix} \quad (9)$$

$(x, y = 1, 2, \ldots, L)$ $l(k) = k - (\lceil N/2 \rceil + 1)$

Figure 5:
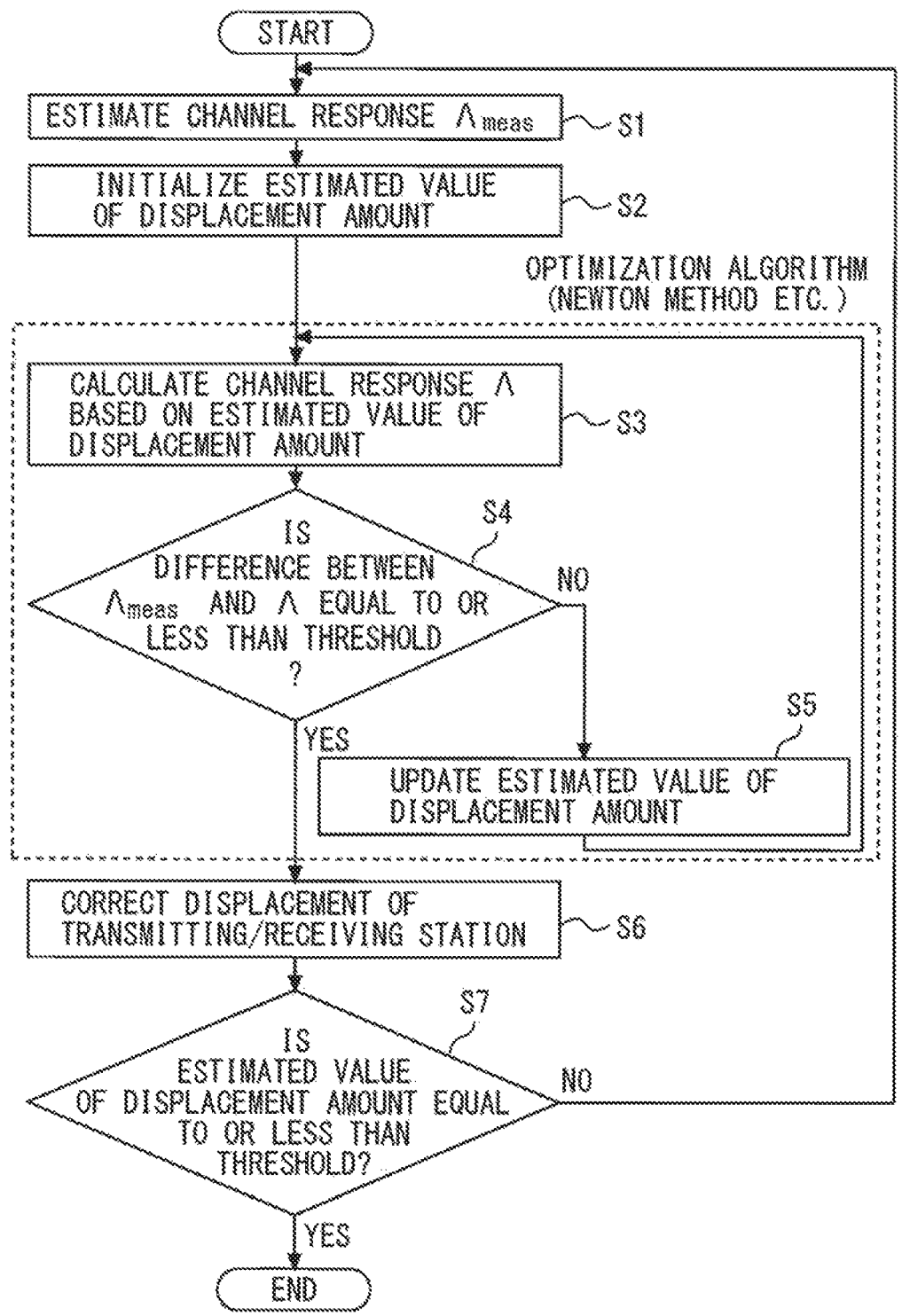
FIG. 5 is a flowchart showing an example of a procedure of a displacement estimation process according to the present invention.

FIG. 5 shows an example of a procedure of the displacement estimation process according to the present invention.

In FIG. 5, first, the channel estimation unit estimates a measured channel response $\Lambda_{meas}$ corresponding to the channel response A in Equation (8) (S1). The measured channel response $\Lambda_{meas}$ corresponds to the channel response of not only an actual propagation channel but also a channel between an output port of the transmitting weight multiplication unit 13 and an input port of the receiving weight multiplication unit 23 including the OAM mode generation unit 14 and the OAM mode separation unit 22.

Next, the displacement amount estimation unit 27 initializes an estimated value of the displacement amount to a value such as 0 (S2), and then calculates the theoretical channel matrix A based on the above-described equations by using the initialized estimated value of the displacement amount (S3).

Then, a difference in magnitude between the obtained theoretical channel matrix A and the measured channel response $\Lambda_{meas}$ is calculated, and an estimated value of the displacement amount that minimizes the difference is calculated (S4 and S5). In other words, the following evaluation function is evaluated.

$$\min(\|\Lambda^H \times \Lambda - \Lambda_{meas}{}^H \times \Lambda_{meas}\|) \quad (10)$$

Here, the theoretical channel matrix Λ and the evaluation function including the theoretical channel matrix are "functions having the estimated value of the displacement amount as a variable." Therefore, a value of the evaluation function can be reduced by updating the estimated value of the displacement amount being a value of an iteration variable by the use of an optimization algorithm such as a gradient method, a Newton method, a genetic algorithm, and many others. Then, the estimated value of the displacement amount when the value of the evaluation function becomes less than a predetermined value is determined as the displacement amount.

More specifically, when the initial value of the estimated value of the displacement amount is set as follows, a value of $\Lambda^H \times \Lambda$ is uniquely defined. Moreover, the value of $\Lambda_{meas}{}^H \times \Lambda_{meas}$ is obtained through measurement.

Finally, the displacement correction unit adjusts a jig or the like of the antenna based on the estimated displacement amount to correct the displacement of each of the transmitting station and the receiving station (S6).

In order to increase accuracy of the displacement correction, the above-described processes may be repeatedly performed a predetermined number of times or until the magnitude of the estimated value of the displacement amount becomes equal to or less than a desired threshold (S7).

Here, with regard to the propagation channel between the antenna elements in a normal line-of-sight situation, a great difference may scarcely occur in the magnitude of each element, but, in the above case, a bias occurs in the value of the channel response by performing the OAM mode generation and separation processes expressed by Equation (3). Therefore, it is possible to estimate the displacement amount with high accuracy by using only the element where sufficiently high energy is obtained without using all elements in computation of the function to be minimized. In this case, it is not necessary to estimate the channel for all available OAM modes. The channel may be estimated for only an OAM mode corresponding to the element of the propagation channel matrix used for estimating the actual displacement amount.

When any linear transform process or the like is included in a process required for communication, a linear transform process that can reduce a computation amount, or the channel response to be measured, the theoretical channel response A including influence of such the process may be used for computation.

In the present embodiment, evaluation of the evaluation function using the propagation channel at a specific frequency is performed. When channel information in a plurality of frequencies can be acquired as in a case of orthogonal frequency division multiplexing (OFDM), for example, the channel matrix in the evaluation function may be expanded by the number of frequency channels that can be used for estimation.

Embodiment 2

In Embodiment 1, the displacement amount is estimated by evaluating the evaluation function using intensities of the theoretical propagation channel and the measured propagation channel. As another example, it is also possible to estimate the displacement amount by using minimization of an absolute value of a difference in a complex amplitude between the theoretical propagation channel and the measured propagation channel as the evaluation function.

In other words, the displacement amount is estimated by evaluating the following function.

$$\min(\|(\Lambda - \Lambda_{meas})^H \times (\Lambda - \Lambda_{meas})\|) \quad (11)$$

Embodiment 3

In Embodiment 1 and Embodiment 2, the displacement amount is estimated by minimizing the difference in intensity or complex amplitude between the theoretical propagation channel and the measured propagation channel. Each method has an advantage and a disadvantage.

First, in the case of the method using the complex amplitude, a phase greatly changes due to a small displacement of the coordinate axis. This becomes remarkable when a high frequency such as a millimeter wave is used. This leads to a situation in which a plurality of local minimum solutions are present in the evaluation function due to a periodic feature of the phase, and thus there is a high probability that a wrong solution may be derived unless an initial value close to a true solution is originally selected.

On the other hand, in the case of the method using the intensity, a change due to the displacement is smooth, and a large error may be included in the estimated value due to the influence of noise or the like.

In view of the above, in order to compensate for the disadvantages and utilize the advantages of both methods, the evaluation function of Embodiment 1 using the intensity is first used to calculate an approximate value of the displacement, particularly a distance between antennae. After that, the approximate value is set as an initial value and the evaluation function of Embodiment 2 using the complex amplitude is used. It is thus possible to estimate the displacement amount with high accuracy without causing a wrong local optimum solution.

Embodiment 4

The methods of Embodiment 1 to Embodiment 3 are not limited to the OAM multiplex transmission technique using the uniform circular array. The displacement amount can be defined and estimated by setting a coordinate axis in any array antenna.

In particular, when weight multiplication or other transform processes are not included, the displacement amount can be estimated by calculating a pure ideal propagation channel matrix H between the antenna elements, and using the propagation channel matrix H and the measured channel matrix $H_{meas}$ to evaluate the evaluation function as in the following Equation (12), for example.

$$\min(\|H^H \times H - H_{meas}^H \times H_{meas}\|) \quad (12)$$

This is an evaluation function equivalent to that of Embodiment 1. Of course, an evaluation function equivalent to that of Embodiment 2 may be used instead. When any line transform process is included in the transmitting and receiving stations, computation may be performed in consideration of the influence thereof in the same manner as in Embodiment 1.

Embodiment 5

Embodiment 5 is different from Embodiments 1 to 4 in that the transmitting and receiving antennae can transmit and receive different polarized waves separately.

In this case, the propagation channel between the receiving antenna element a and the transmitting antenna element b is expressed as a partial channel matrix using two polarized waves orthogonal to each other, as follows.

$$\frac{\lambda^2}{4\pi d_{a,b}}\left(\frac{1}{2\pi d_{a,b}} + \frac{1}{i\lambda}\right)\exp(-2i\pi d_{a,b}) \times \begin{pmatrix} X_{tx} \cdot X_{rx} & Y_{tx} \cdot X_{rx} \\ X_{tx} \cdot Y_{rx} & Y_{tx} \cdot Y_{rx} \end{pmatrix} \quad (13)$$

Here, $$X_{tx} = R_z(\psi/2) \times R_x(\varphi_{tx}) \times R_y(\theta_{tx}) \times \begin{pmatrix} 1 \\ 0 \\ 0 \end{pmatrix}$$

$$X_{rx} = R_z(-\psi/2) \times R_x(\varphi_{rx}) \times R_y(\theta_{rx}) \times \begin{pmatrix} 1 \\ 0 \\ 0 \end{pmatrix}$$

$$Y_{tx} = R_z(\psi) \times R_x(\varphi_{tx}) \times R_y(\theta_{tx}) \times \begin{pmatrix} 0 \\ 1 \\ 0 \end{pmatrix}$$

$$Y_{rx} = R_z(\psi) \times R_x(\varphi_{rx}) \times R_y(\theta_{rx}) \times \begin{pmatrix} 0 \\ 1 \\ 0 \end{pmatrix}$$

From the above description, expanding the equation as described above when calculating the theoretical channel response A makes it possible to cope with a case of using the antenna elements that can transmit and receive different polarized waves separately.

REFERENCE SIGNS LIST

10 TRANSMITTING STATION
11 SIGNAL PROCESSING UNIT
12, 13 TRANSMITTING WEIGHT MULTIPLICATION UNIT
14 OAM MODE GENERATION UNIT
15 TRANSMITTING UCA
16 DISPLACEMENT CORRECTION UNIT
20 RECEIVING STATION
21 RECEIVING UCA
22 OAM MODE SEPARATION UNIT
23 RECEIVING WEIGHT MULTIPLICATION UNIT
25 SIGNAL PROCESSING UNIT
26 CHANNEL ESTIMATION/RECEIVING WEIGHT CALCULATION UNIT
27 DISPLACEMENT AMOUNT ESTIMATION UNIT
28 DISPLACEMENT CORRECTION UNIT
29 FEEDBACK UNIT

The invention claimed is:

1. An antenna displacement correction method for an orbital angular momentum (OAM) multiplexing communication system that performs spatial multiplex transmission by using different spatial multiplex modes between a transmitting antenna and a receiving antenna respectively included in a transmitting station and a receiving station disposed to face each other in a line-of-sight situation, the antenna displacement correction method comprising:

a displacement amount estimation step that estimates a displacement amount by evaluating an evaluation function defined such that a theoretical channel response between the transmitting antenna and the receiving antenna matches a measured channel response estimated in the receiving station by using a known signal transmitted from the transmitting station, wherein the theoretical channel response has, as a parameter, the displacement amount indicating an amount of displacement of a reference axis predefined for each of the transmitting antenna and the receiving antenna from a predetermined position with respect to a desired relative positional relationship between the transmitting antenna and the receiving antenna; and a displacement correction step that corrects a displacement of each of the transmitting antenna and the receiving antenna according to the estimated displacement amount.

2. The antenna displacement correction method for the OAM multiplexing communication system according to claim 1, wherein each of the transmitting antenna and the receiving antenna includes a single equal-interval uniform circular array (UCA) or a plurality of UCAs disposed concentrically, and the displacement amount estimation step:

includes a step that performs, in the transmitting station and the receiving station, processes corresponding to discrete Fourier transform and inverse transform with a same magnitude as a number of antenna elements of the UCA with respect to each propagation channel formed between the UCAs of the transmitting antenna and the receiving antenna; and estimates the displacement amount by evaluating the evaluation function that is defined by using a channel response including the processes corresponding to the discrete Fourier transform and the inverse transform.

3. The antenna displacement correction method for the OAM multiplexing communication system according to claim 1, wherein the evaluation function is an absolute value of a difference in one or more corresponding elements between the theoretical channel response and the measured channel response.

4. The antenna displacement correction method for the OAM multiplexing communication system according to claim 1, wherein the evaluation function is an absolute value of a difference in magnitude of one or more corresponding elements between the theoretical channel response and the measured channel response.

5. The antenna displacement correction method for the OAM multiplexing communication system according to claim 1, wherein the displacement amount is estimated by using different frequencies, different polarized waves, or both thereof.

* * * * *